United States Patent [19]

Kawamura et al.

[11] Patent Number: 4,902,950

[45] Date of Patent: Feb. 20, 1990

[54] NUMERICAL CONTROL METHOD WITH RESPONSE DELAY COMPENSATING FUNCTION

[75] Inventors: Hideaki Kawamura, Hachiouji; Kentaro Fujibayashi, Mitaka; Haruhiko Kozai, Hachioji, all of Japan

[73] Assignee: Fanuc Ltd., Yamanashi, Japan

[21] Appl. No.: 247,442

[22] PCT Filed: Feb. 4, 1988

[86] PCT No.: PCT/JP88/00105
§ 371 Date: Aug. 11, 1988
§ 102(e) Date: Aug. 11, 1988

[87] PCT Pub. No.: WO88/05935
PCT Pub. Date: Aug. 11, 1988

[30] Foreign Application Priority Data

Feb. 4, 1987 [JP] Japan .................................. 62-22498

[51] Int. Cl.⁴ ............................................... G05B 5/00
[52] U.S. Cl. .................................... 318/627; 318/626; 318/630; 318/632; 318/561
[58] Field of Search ............... 318/627, 626, 630, 632, 318/561, 571

[56] References Cited

U.S. PATENT DOCUMENTS 4,020,331  4/1977  Kimura et al. .................. 318/571 X
4,504,917  3/1985  Grimm et al. ....................... 364/474

Primary Examiner—William M. Shoop, Jr.
Assistant Examiner—Saul M. Bergmann
Attorney, Agent, or Firm—Staas & Halsey

[57] ABSTRACT

A numerical control method is provided, which is capable of compensating for a response delay of a servo system to command pulses to thereby make it possible to repetitively effect reciprocal movement of a controlling object at a high speed over the entirety between target positions inclusive of these positions, without the need of increasing a time period for execution of a desired operation.

A time period (T0) required for delivering all of the command pulses for forward movement is calculated on the basis of a commanded moving amount and a commanded feed rate (V0) stated in a program, and a corrected feed rate (V1) is calculated in dependence on the amount of command pulses for backward movement delivered over a time period (t2) starting at an instant (t1) that delivery of command pulses for backward movement is started and ending at an instant a positional deviation becomes zero, and further, the command pulses for forward movement and for backward movement are delivered over the time period (T0) at the corrected feed rate (V1), respectively.

10 Claims, 8 Drawing Sheets

NUMERICAL CONTROL METHOD WITH RESPONSE DELAY COMPENSATING FUNCTION

BACKGROUND OF THE INVENTION

1. Field of the Invention

The present invention relates to a numerical control method for compensating for a delay of a servo system in responding to a moving command so as to repetitively perform reciprocal movement of a controlled object at a high speed between target positions inclusive of these target positions.

2. Description of the Related Art

Conventionally, it has been known to drive a controlled object for repetitive reciprocal movement by means of a numerical control apparatus through a servo system. In numerical control of this kind, it has been also known to effect acceleration/deceleration control on a moving command supplied from the numerical control apparatus, i.e., a command pulse train (hereinafter referred to as command pulses), so as to reduce a response delay of the servo system, and to relieve load applied to the servo system, etc. upon inversion of the sign of the command pulses (upon start of and completion of delivery of the command pulses). However, in the case of acceleration/deceleration control being effected, a period of time for execution of reciprocal movement increases. On the other hand, in order to shorten the execution time, if the delivery of command pulses for forward or backward movement of the controlled object is immediately followed by the delivery of the subsequent command pulses for opposite movement, i.e., for backward or forward movement of the controlled object, without acceleration/deceleration control being performed, the subsequent command pulses, having the sign opposite that of the former command pulses, are delivered before the controlled object reaches the target position, so that the remaining part of the former command pulses is canceled by an initial part of the latter command pulses. As a result, the moving direction of the controlled object is reversed immediately before the target position is reached, and hence the controlled object cannot reach the target position. Accordingly, it is impossible to accurately carry out the reciprocal movement of the controlled object between the target positions inclusive of these positions, in accordance with the commanded locus.

SUMMARY OF THE INVENTION

An object of the present invention is to provide a numerical control method for compensating for a response delay of a servo system to a moving command so as to repetitively effect a high-speed reciprocal movement of a controlled object between target positions inclusive of these target positions.

In order to achieve the above-mentioned object, in a numerical control method for repetitively and alternately effect forward movement and backward movement of a controlled object, a numerical control method according to the present invention comprises the steps of (a) reading a program in which commanded amount of forward movement, commanded amount of backward movement, commanded feed rate for forward movement, and commanded feed rate for backward movement are stated, respectively, (b) calculating a command time period required for delivery of all of first command pulses relating to one of the forward movement and the backward movement of the controlled object on the basis of contents of statement of the thus read program, (c) detecting an amount of second command pulses delivered over a time period from an instant at which delivery of the second command pulses is started to an instant at which an amount of positional deviation becomes less than a predetermined value, said second command pulses relating to the other of the forward movement and backward movement of the controlled object, (d) calculating a corrected commanded feed rate for at least one of the forward movement and backward movement in dependence on the detected delivery amount of said second command pulses, and (e) delivering at least one of said first and second command pulses at said corrected commanded feed rate over said calculated command time period.

As mentioned above, according to the present invention, command pulses are delivered at the corrected feed rate, which depends on the delivered amount of command pulses relating to one of the forward and backward movements and consumed for cancellation of command pulses relating to another movement, over the same time period as in the case where the feed rate is not corrected. Accordingly, it is possible to compensate for a response delay to the moving command or command pluses, without the need of increasing a time period for execution of the reciprocal movement, so as to repetitively effect the reciprocal movement of the controlled object at a high speed between target positions inclusive of these positions.

DETAILED DESCRIPTION OF THE PREFERRED EMBODIMENTS

Prior to explaining the present invention, an explanation of a conventional numerical control method will be given with reference to FIGS. 5 to 10.

Figure 5:
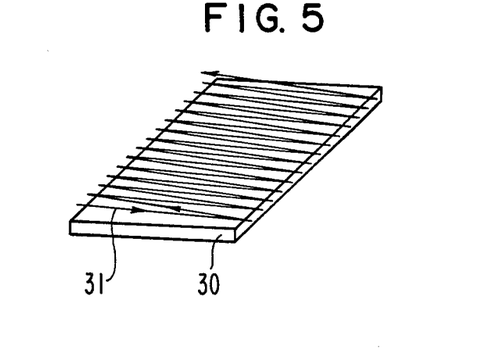
FIG. 5 is a schematic perspective view showing workpiece machining to which a method of the present invention is applied.
Figure 6:
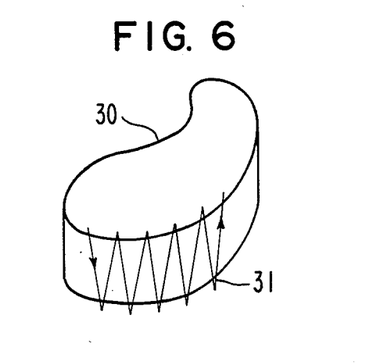
FIG. 6 is a schematic perspective view showing another workpiece machining.
Figure 7:
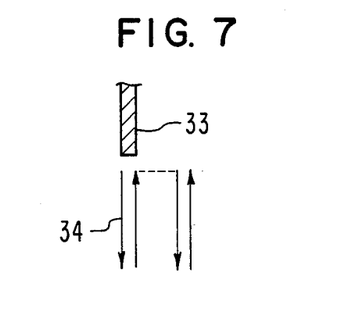
FIG. 7 is a view showing drilling.

As mentioned above, it has been known to drive a controlled object for reciprocal movement by a numerical control apparatus through a servo system. FIGS. 5 and 6 show examples of workpiece machining where a wheel, a jig grinder, etc., as the controlled object, are repetitively reciprocated (swing movement, oscillating movement) on an upper face of or an end face of a workpiece 30 along a tool locus 31, and FIG. 7 shows another example where a drill 33 as the controlled object is reciprocated at each drilling position as shown by the directional arrow 34, to thereby perform a series of drilling movements. In the meantime, generally, a fixed cycle function of the numerical control apparatus is utilized for the above-mentioned types of machining.

Figure 8:
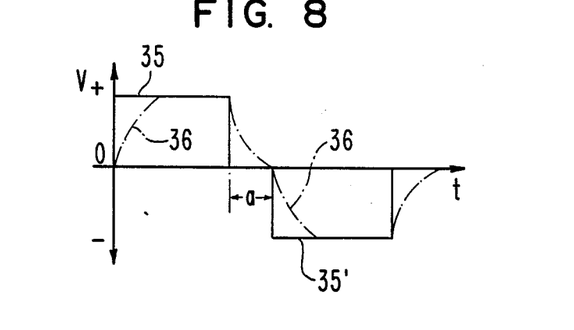
FIG. 8 is a view explaining a conventional numerical control method with acceleration/deceleration control function.
Figure 9:
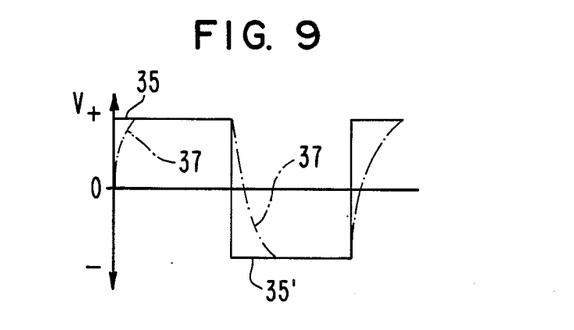
FIG. 9 is a view explaining a conventional method without acceleration/deceleration control function.
Figure 10:
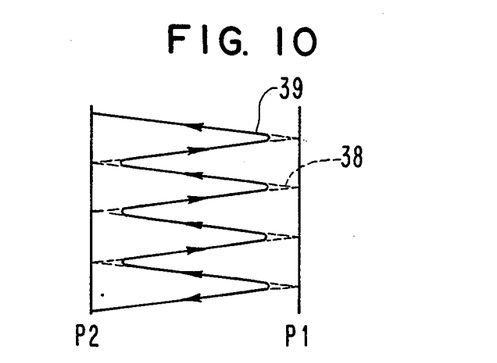
FIG. 10 is a view showing a tool locus in the conventional method of FIG. 9 in comparison with a commanded locus.

Conventionally, in numerical control of these kinds, acceleration/deceleration control shown in FIG. 8 is sometimes carried out. In this case, when a servo system (not shown) is supplied with a forward moving command 35 for causing a servomotor (indirect controlled object) of the servo system to be driven in the forward direction at a preset speed $+V$ up to a target position for forward rotation, acceleration/deceleration processing is executed in an acceleration/deceleration control section (not shown) provided between a numerical control apparatus (not shown) and the servo system, for instance. Then, distributed pulses, corresponding to a moving command 36 subjected to acceleration/deceleration processing and shown by one dotted chain line, are applied to the servomotor, so that the servomotor rotates forwardly, for instance, up to the target position for forward rotation, without a particular response delay being generated. Thereafter, a backward moving command 35' is delivered when the target position for forward movement is reached. Then, in accordance with this command, the servomotor is driven reversely at a preset speed $-V$ (minus sign indicates the direction of rotation) up to a target position for reverse rotation. In this manner, the above-mentioned forward and reverse rotations are repetitively carried out, and a primary controlled object, a tool (not shown), for instance, is accurately reciprocated along the commanded locus (not shown). According to this numerical control method, a time period required for execution of a desired operation is increased in every reciprocal movement by a deceleration section a although the controlled object can be driven along the commanded locus.

On the other hand, in the case where no acceleration/deceleration control is made, that is, where the delivery of one of the forward moving command 35 and the backward moving command 35' is started immediately after completion of the delivery of another command, the servomotor is rotated forwardly or reversely with a delay to the moving command 35 or 35' as shown by one dotted line 37 because the servo system generally operates with a response delay to the moving commands 35, 35'. As a consequence, upon start of delivery of the backward moving command 35', for instance, a deviation (+) between the target position for forward rotation and an actual rotational position remains in an error register housed in the servo system. Thereafter, this deviation is gradually canceled as the backward moving command 35' is delivered, the sign of the command 35' being opposite that of the forward moving command 35. Further, a deviation (−) having opposite sign is gradually accumulated in the error register. As a result, the rotational direction of the motor is reversed before the target position for forward rotation is reached. Similarly, the motor rotation direction is reversed before the target position for reverse rotation is reached upon start of delivery of the forward moving command 35. Therefore, an actual tool locus is given by the locus shown by reference numeral 39 even when the controlled object such as a tool is intended to be repetitively reciprocated between the target position P1 for forward rotation and that P2 for reverse rotation along a commanded locus 38 as shown by one dotted chain line in FIG. 10. Thus, it is not possible to accurately drive the tool along the commanded locus 38 and over the entire region between the target positions P1, P2 inclusive of these positions.

Figure 1:
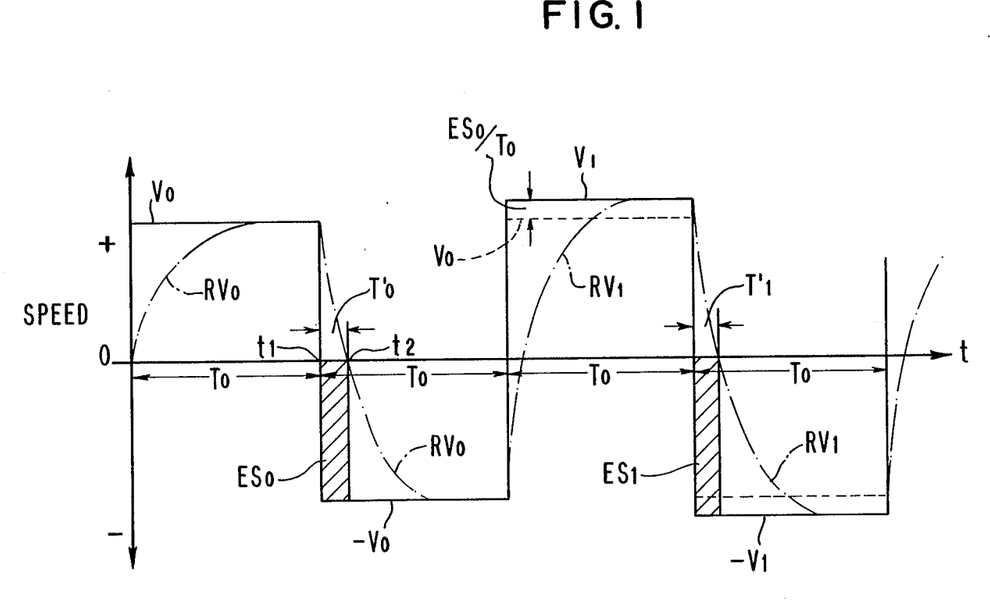
FIG. 1 is a view for explaining the concept of a numerical control method according to the present invention.

In the following, the concept of a numerical control method of the present invention will be explained with reference to FIG. 1.

Here, it is assumed that a fixed cycle command is read out from an NC program by a numerical control apparatus, which serves as a repetitive reciprocal movement command for alternately delivering a forward moving command and a backward moving command, the forward moving command being delivered for effecting forward movement of a servomotor (not shown), as a controlled object (hereinafter, the servomotor is considered as the controlled object for convenience of explanation), over a moving amount of S0 (not shown) at a feed rate of $+V$, the backward moving command being delivered for effecting backward movement at the same feed rate over the same moving amount as those in the forward movement. At first, in accordance with the forward moving command, the numerical control apparatus delivers a command pulse train (hereinafter referred to as command pulses) in the direction of forward movement for a time period T0 ($=$S0/V0). In response to this, the servomotor rotates in a predetermined direction, i.e., in the forward direction, for instance. At this time, the rotational speed of the motor gradually increases as shown by chain line RV0 by virtue of a response delay of the servo system to the moving command or the command pulses. Upon elapse of the command pulse delivering time period T0 (t=t1), the numerical control apparatus delivers command pulses in the backward moving direction for the same time period, so as to execute the backward moving command. At the time point of t1, the delivery of the command pulses relating to the backward moving command to an error register of a servo circuit, which forms the servo system, is started. However, the drive of the servomotor in the forward rotational direction is still continued because accumulated pulses, corresponding to a positional deviation between the commanded amount of forward movement and an actual moving amount, remain in the error register. The positional deviation gradually decreases as feedback pulses are supplied from the position detector with this forward rotation and the command pulses associated with the backward moving command are supplied. At the time point of t2, the deviation becomes "0". That is, the command pulses supplied over the time period T'0, starting from the time point of t1 and ending at the time point of t2, and relating to the backward moving command are consumed to cancel part of accumulated pulses relating to the forward moving command. As a consequence, the forward moving command is decreased in amount by the moving command amount T'0·V0=ES0, which corresponds to the number of the command pulses associated with the backward moving command and delivered during the time period T'0. Hence, the servomotor can only reach the rotational position short of the target position for forward rotation by a rotation angle corresponding to the above-mentioned distance ES0. Therefore, when the aforementioned rotational position is reached, the servomotor is rotated reversely in accordance with the backward moving command, and hence a shortage of forward movement occurs. Also, there occurs a shortage of backward movement similar to that of forward movement.

The present invention has been created on the basis of the aforementioned recognition, and contemplates eliminating the occurrence of a shortage of movement, without the need of increasing a time period for execution of a desired reciprocal movement by correcting a commanded feed rate in accordance with an amount of shortage of movement.

In the following, a further explanation will be given as to the case where the same commanded moving amount and the same commanded feed rate are employed between reciprocal forward movement and backward movement, and correction of the commanded feed rate for the subsequent pair of forward and backward operations is carried out simultaneously.

At first, a command time period T0 (which has the same value between forward movement and backward movement) for which the command pulses for forward movement (or backward movement) is calculated on the basis of the commanded moving amount S0 and the commanded feed rate V0. Next, the commanded feed rate for the subsequent reciprocal movement is increasingly corrected in accordance with the delivered amount (the amount of shortage of movement) ESi of the command pulses, which relates to the backward moving command and has been consumed to decrease the number of accumulated pulses or a positional deviation (error register value) during a time period Ti'. This time period Ti' starts at an instant at which the delivery of command pulses associated with the backward moving command is started and ends at an instant at which the number of accumulated pulses or a positional deviation (error register value) associated with the forward moving command decreases to a value less than a predetermined allowable value (here a value of "0"), and the suffix i indicates the number of times by which correction of the feed rate has been made as described later. For instance, reference symbol T1' in FIG. 1 indicates a time period corresponding to the time period T0', with the feed rate corrected once. More specifically, the corrected feed rate $Vi\ (=V_{i-1}+(ESi/T0))$ is obtained by adding the value, obtained by dividing the shortage amount of movement ESi by the command pulse delivery time period T0, and the commanded feed rate specified by the program or the corrected feed rate $V_{i-1}$. Thereafter, the subsequent forward and backward moving operations are carried out in sequence over the time period T0 by the use of the corrected feed rate Vi. A predicted target moving amount Si (not shown) for each operation is represented by the following equation.

$$Si = Vi \cdot T0 - Ti' \cdot Vi = Vi \cdot T0 - ESi$$

Then, a determination is made as to whether or not the difference S0−Si between the aforementioned target moving amount Si and the commanded moving amount S0 specified by the program falls within a predetermined allowable region. If it is determined that the difference falls outside the allowable region, the feed rate having been already corrected is further corrected to obtain the feed rate for the subsequent reciprocal movement. On the other hand, if it is determined that the difference falls within the allowable region, the same corrected feed rate is still employed for the subsequent reciprocal movement. In this manner, as a result of the commanded feed rate specified by the NC program being corrected by required number of times, the servomotor is driven to the target rotational position.

In the following, the numerical control method according to an embodiment of the present invention will be explained.

Figure 2:
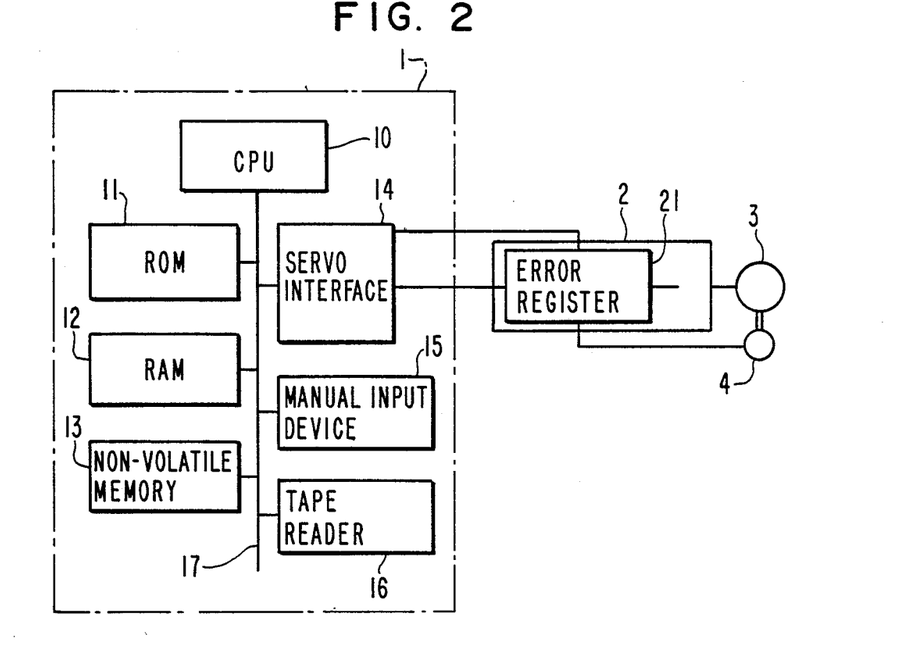
FIG. 2 is a schematic block diagram showing an arrangement of a system for embodying a numerical control method according to a first embodiment of the present invention.

FIG. 2 shows, by way of example, an arrangement of a system embodying the numerical control method according to the embodiment of the present invention. This system is so arranged that a servomotor 3 is driven in the forward and reverse directions by the use of a servo circuit 2 to which command pulses from a numerical control apparatus (hereinafter referred to as NC) are applied. An error register 21 of the servo circuit 2 is supplied with feedback pulses from a position detector 4 for detecting the rotational position of the servomotor 3. The servo circuit 2, the servomotor 3 and the position detector 4 correspond to one of plural control axes of an NC machine tool (not shown), for instance. Elements (not shown) corresponding to the elements 2 to 4 are provided for each of or the at least one control axis other than the above-mentioned one control axis. A primary controlled object such as a tool equipped with the NC machine tool is arranged to be driven along these control axes.

The NC 1 comprises a central processing unit (hereinafter referred to as CPU) 10 which is connected through buses 17 to a ROM 11 storing a control program, a RAM 12 for temporal storage of data or the like, a non-volatile memory 13 storing an NC machining program and various parameters, a servo interface 14, a manual input device 15, and a tape reader 16 for reading the NC machining program from an NC tape. Further, the aforementioned servo circuit 2 is connected to the servo interface 14, so that command pulses as moving command are applied from the NC 1 to the error register 21 of the servo circuit 2 through the servo interface 14, and the value of the error register 21 is read by the NC 1.

With reference to the operational flowchart of FIG. 3, the operation of the NC 1 will be explained.

The NC 1 reads the NC machining program from the non-volatile memory 13 or from the tape reader 16. Upon reading a fixed cycle command contained in the program, the NC 1 stores a commanded feed rate V0 for forward movement associated with the fixed cycle command in a register V (the step S1). Then, the NC 1 divides the commanded forward moving amount S0 by the commanded feed rate V0 to obtain a time period (hereinafter referred to as command time period) T0 required for delivery all of the command pulses, and stores the command time period T0 in a register T (the step S2). The NC 1 delivers pulses to the servo circuit 2 through the servo interface 14 at the feed rate Vi (i=0, 1, —, initially, the commanded feed rate V0 specified by the program) stored in the register V, and sets a timer TR1 at the command time period T0 stored in the register T and then starts the same timer (the step S3). Then, the CPU 10 determines whether or not the timer TR1 is time up. During that time, the command pulses are applied to the error register 21 of the servo circuit 2 at the feed rate Vi stored in the register V, and the servo circuit 2 operates to drive the servomotor 3 in the forward direction in accordance with the command pulses. As the servomotor 3 is driven, the position detector 4 generates feedback pulses with rotation of the servomotor 3, and the stored value of the error register 21 decreases each time the feedback pulse is supplied to the same register. Thereafter, when the timer TR1 is time up (the step S4), the CPU 10 starts delivery of command pulses in the direction of backward movement (minus direction) at the feed rate Vi stored in the register V, and at the same time, sets the timer TR1 at the command time period T0 stored in the register T and starts the same timer. Further, the CPU resets and then starts a timer TR2 (the step S5). The CPU 10 continues to monitor the stored value of the error register 21 or the positional deviation amount, so as to detect whether or not the time point at which the deviation becomes "0", i.e., the time point of t2 of FIG. 1 is reached (the step S6). When the deviation reaches "0", the timer TR2 is stopped, and then the value of the same timer TR2 is read out (the step S7). This value of the timer TR2 represents the elapsed time period Ti' (for instance, T0' in FIG. 1), starting from an instant at which the delivery of the command pulses for forward movement is changed over to the delivery of the command pulses for backward movement, in the present control cycle. The CPU 10 multiplies the current feed rate Vi by the aforementioned value of the timer TR2 to obtain an amount of shortage in relation to the forward moving command outputted from the NC 1, and stores same in a register ES (the step S8). Next, the value of the register ES is subtracted from the value (Vi·T0) obtained by multiplying the current feed rate Vi by the command time period T0. As mentioned above, the value (Vi·T0) corresponds to the commanded forward moving amount outputted from the NC 1 to the error register 21, whereas the value of the register ES indicates an amount outputted from the NC 1 to the error register 21 and consumed to cancel part of the commanded forward moving amount during the time period Ti' starting at an instant at which the delivery of the command pulses for backward movement is started and ending at an instant at which the value of the error register becomes "0". Accordingly, the result of the subtraction (Vi·T0−ES) represents the actual forward moving amount of the servomotor 3. Further, the CPU 10 determines whether or not the amount of shortage of movement (S0−(Vi·T0−ES)), obtained subtracting the actual moving amount from the forward moving amount specified by the program, is less than a predetermined allowable upper limit value e1 (the step S9).

If the result of determination at the step S9 is negative (NO), the program proceeds to the step S10 where the value of the register ES' indicative of the amount of shortage of movement detected in the preceding control cycle is subtracted from the value of the register ES, and further a determination is made as to whether or not this value is less than a predetermined value e2.

Initially, the value of the register ES' is "0", and hence the result of the aforementioned determination is negative (NO), and thus the program advances to the step S13. In this step S13, the value of the register ES is stored in the register ES', and a determination is made as to whether or not the timer TR1 is time up, that is, whether or not the delivery of the command pulses for backward movement is completed (the step S14). If the completion of delivery is determined and if a fixed cycle completion command is not delivered, the program proceeds to the step S3 again. Then, the same processing as that of the steps S3 to S9 is carried out. If it is determined at the step S10 that the difference between the value of the register ES and that of the register ES' is less than the predetermined value e2, the value of the register ES is divided by the command time period T0 (the step S11), and the resultant value is added to the register V, to obtain a corrected commanded feed rate $V_{i+1}$ (the step S12). When the timer TR1 is time up and if the fixed cycle completion command is not delivered (the step S15), the subsequent reciprocal movement will be done by the use of the thus increasingly corrected commanded feed rate $V_{i+1}$.

In the meantime, the processing of the step S10 is provided to avoid unstable control due to an excessive feed rate change, and thus this processing is not inevitably necessary. In the case of the step S10 being eliminated, the program is so prepared that the program advances to the step S11 if the result of the determination at the step S9 is negative, and then the program proceeds from the step S11 to the steps S12 and S14. In this case, the feed rate can be changed at every reciprocal movement.

After the aforementioned processing is repeated, if it is determined at the step S9 that the difference between the commanded moving amount S0 specified by the program and the predicted moving amount (V·T0−ES) of the servomotor 3 is less than the predetermined allowable upper limit value e1, the program proceeds to the step S16, without the execution of further correction of the feed rate, and then a determination is made as to whether or not the timer TR1 is time up. If the same timer is time up, a fixed cycle, where the delivery of the command pulses at the feed rate stored in the register V over the time period T0 stored in the register T is repeated and alternately carried out in the direction of forward movement and backward movement, is performed until when the fixed cycle completion command is received (the steps S17 and S18).

In the aforementioned embodiment, the time period from the start of the command pulses for backward movement to an instant at which the error register becomes zero is detected by the use of the timer TR2, and then an amount of shortage of movement is obtained from the thus detected time period and the feed rate. However, in stead of this, the amount of shortage of movement may be directly obtained by detecting an amount of command pulses outputted by detecting an amount of command pulses outputted from the NC 1 during the above-mentioned time period.

Figures 4, 4A:
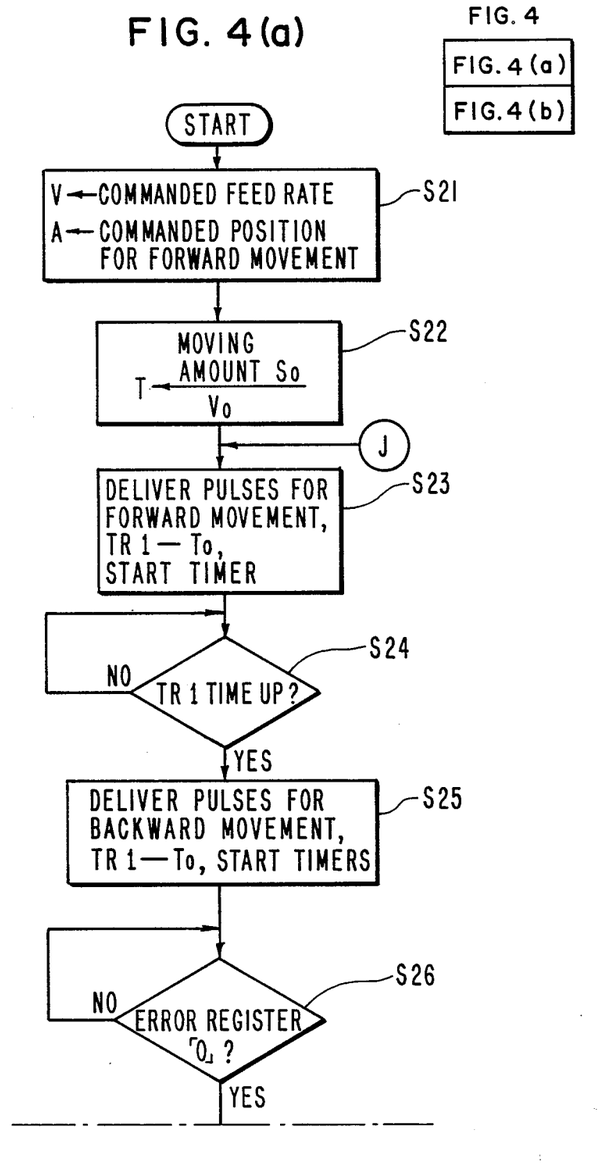
FIGS. 4A and 4B are a flowchart showing a method according to a second embodiment of the present invention.
Figure 4B:
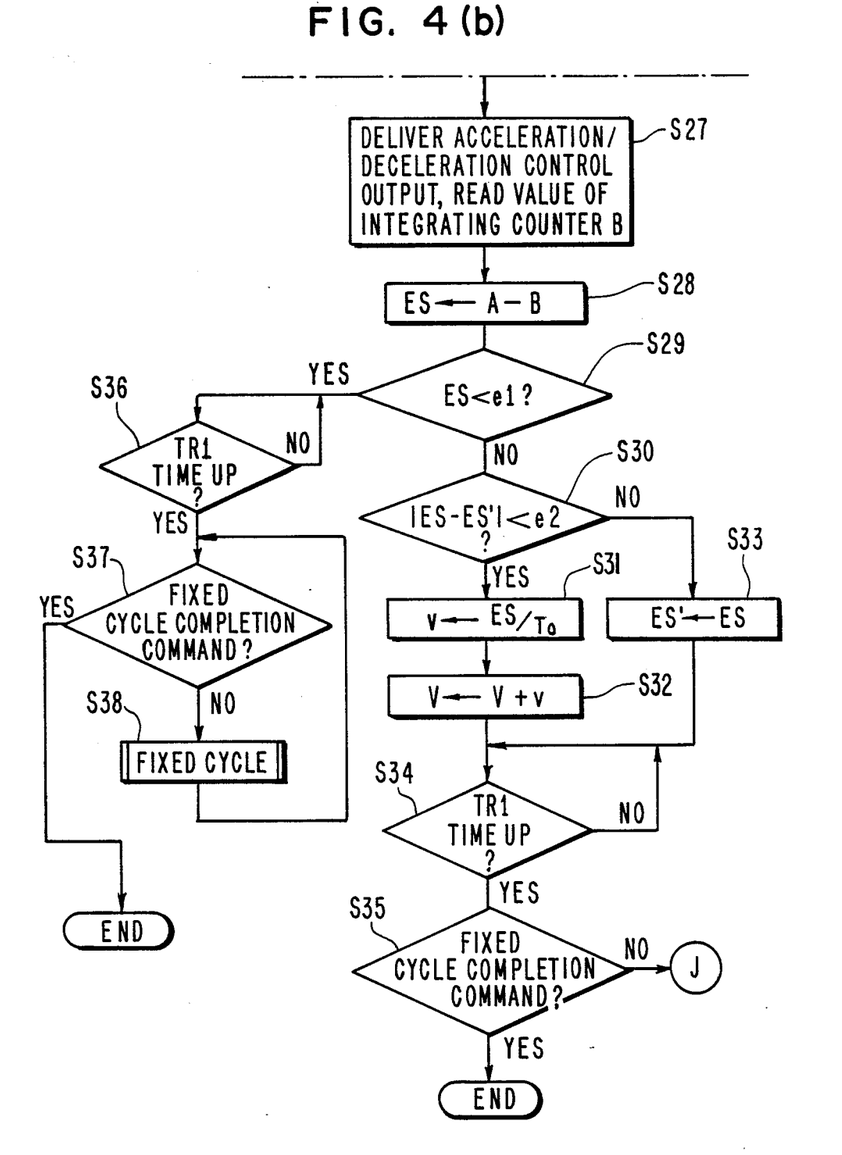

With reference to FIG. 4, a numerical control method according to a second embodiment of the present invention will be explained.

Figure 11:
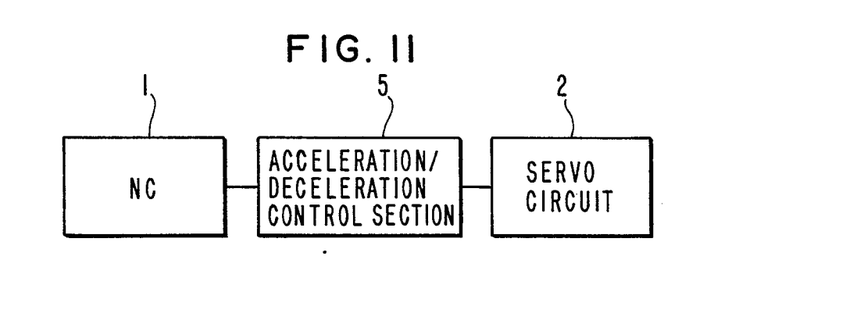
FIG. 11 is a schematic block diagram showing an arrangement of a system relating to a second embodiment of the present invention.

As compared with the foregoing embodiment, the method of this embodiment mainly differs therefrom in that acceleration/deceleration control is performed. To this end, this method is applied, for instance, to a system of FIG. 11 wherein a conventionally known acceleration/deceleration control section 5 is arranged between the NC 1 and the servo circuit 2.

When the NC 1 reads the fixed cycle command from the NC machining program, it executes the steps S21 to S26 corresponding to the steps S1 to S6 of FIG. 32. Here, an explanation as to the processing in these steps S21 to S26 is omitted. To be noted, as different from the foregoing embodiment, the target position for forward movement is stored in the register A at the step S21, and the command pulses supplied from the NC 1 are subjected to acceleration/deceleration processing in the acceleration/deceleration control section 5, and are then applied to the servo circuit 2 and to an integrating counter B, respectively. The value of the integrating counter B represents the command moving position. The servomotor 3 assumes its rotational position corresponding to the value of the integrating counter B when the value of the error register 21 is "0".

When determining the value of the error register 21 becomes "0" (the step S26), the CPU 10 subtracts the value of the integrating counter B, indicative of the actual rotational position of the servomotor 3 at that time point, from the target position for forward movement stored in the register A, so as to obtain the amount of shortage of movement, and then the thus calculated shortage amount of movement is stored in the register ES (the step S28). Next, whether or not the value of the register ES is less than the predetermined value e1 is determined (the step S29). If the result of the determination is negative, the steps S30 to S35 corresponding to the steps S10 to S15 are carried out, and, if desired, the processing of the step S23 and the subsequent steps is repeatedly carried out. That is, the feed rate V is increasingly corrected for compensation of the shortage amount of movement as in the first embodiment. On the other hand, the result of the determination of the step S29 is positive, the steps S36 to S38 corresponding of the steps S16 to S18 are carried out.

We claim:

1. In a numerical control method for repetitively and alternately effect forward movement and backward movement of a controlled object, a numerical control method with response delay compensating function, comprising the steps of:
   (a) reading a program in which a commanded amount of forward movement, a commanded amount of backward movement, a commanded feed rate for forward movement, and a commanded feed rate for backward movement are stated, respectively;
   (b) calculating a command time period required for delivery of all of first command pulses relating to the forward movement of the controlled object on the basis of contents of statement of the thus read program;
   (c) detecting an amount of second command pulses delivered over a time period from an instant at which delivery of the second command pulses is started to an instant at which an amount of an error register associated with the forward movement commanded amount becomes less than a predetermined value, said second command pulses relating to the backward movement of the controlled object;
   (d) calculating a corrected commanded feed rate for subsequent forward movement and the backward movement as a function of the detected delivery amount of said second command pulses; and
   (e) delivering subsequent first and second command pulses at said corrected commanded feed rate over said calculated command time period.

2. A numerical control method with response delay compensating function according to claim 1, wherein said commanded amount of forward movement is the same as said commanded amount of backward movement, and said commanded feed rate for forward movement is the same as said commanded feed rate for backward movement, which are stated in said program, respectively, and, in said step (e), said subsequent first and second command pulses are sequentially delivered over said calculated command time period at said corrected feed rate.

3. A numerical control method with response delay compensating function according to claim 1, wherein, after execution of an initial control cycle including said series of steps (a) to (e), a control cycle including said steps (c) to (e) is repetitively carried out, and said numerical control method further includes the step (f) of executing said step (e) by succeedingly using the feed rate obtained in the preceding control cycle when it is determined that the delivery amount of said second command pulses detected by said step (c) is less than a predetermined value.

4. A numerical control method with response delay compensating function according to claim 1, wherein after execution of an initial control cycle including said series of steps (a) to (e), a control cycle including said steps (c) to (e) is repetitively carried out, and said numerical control method further includes the step (g) of calculating either one of a calculated forward moving amount and a calculated backward moving amount, and of executing said step (e) by succeedingly using the corrected feed rate obtained in the preceding control cycle when it is determined that the difference between the aforementioned calculated forward or backward moving amount and an associated one of said commanded amount of forward movement and said commanded amount of backward movement is less than a predetermined amount.

5. A numerical control method with response delay compensating function according to claim 4, wherein said calculated amount is obtained in said step (g) by subtracting the amount of said second command pulses detected by said step (c) from the product of said calculated command time period and a corresponding one of said commanded feed rate for forward movement stated in said program, said commanded feed rate for backward movement stated in said program, and said corrected feed rate.

6. A numerical control method with response delay compensating function according to claim 3, wherein said step (d) is executed solely when the difference between the quantity of said second command pulses detected by said step (c) of the present control cycle and the quantity of said second command pulses detected in the preceding control cycle is less than a predetermined value.

7. A numerical control method with response delay compensating function according to claim 1, wherein said command pulses are subjected to acceleration/deceleration processing.

8. A numerical control method with response delay compensating function according to claim 1, wherein said commanded amount of forward movement, said commanded amount of backward movement, said commanded feed rate for forward movement, and said commanded feed rate for backward movement are provided in the form of a fixed cycle command.

9. A numerical control method with response delay compensating function according to claim 1, wherein said predetermined value of the positional deviation in said step (c) is set to a value of zero.

10. A numerical control method with response delay compensating function according to claim 4, wherein said step (d) is executed solely when the difference between the quantity of said second command pulses detected by said step (c) of the present control cycle and the quantity of said second command pulses detected in the preceding control cycle is less than a predetermined value.

* * * * *

UNITED STATES PATENT AND TRADEMARK OFFICE
CERTIFICATE OF CORRECTION

PATENT NO. : 4,902,950

DATED : February 20, 1990

INVENTOR(S) : Kawamura et al

It is certified that error appears in the above-identified patent and that said Letters Patent is hereby corrected as shown below:

```
Front Page [57], line 4, change "control-" to
--controlled--.
         line 5, delete "ling".

Col. 2,  line 40, delete "a" and change "flowchart" to
         --flowcharts--;
         line 43, delete "a" and change "flowchart" to
         --flowcharts--.

Col. 6,  line 61, change "V" to --V--;
         line 63, change "T" to --T--;
         line 67, change "V" to --V--.

Col. 7,  line  9, change "v" to --V--;
         line 11, change "T" to --T--;
         line 47, after "obtained" insert --by--.

Figures 3, 3A:
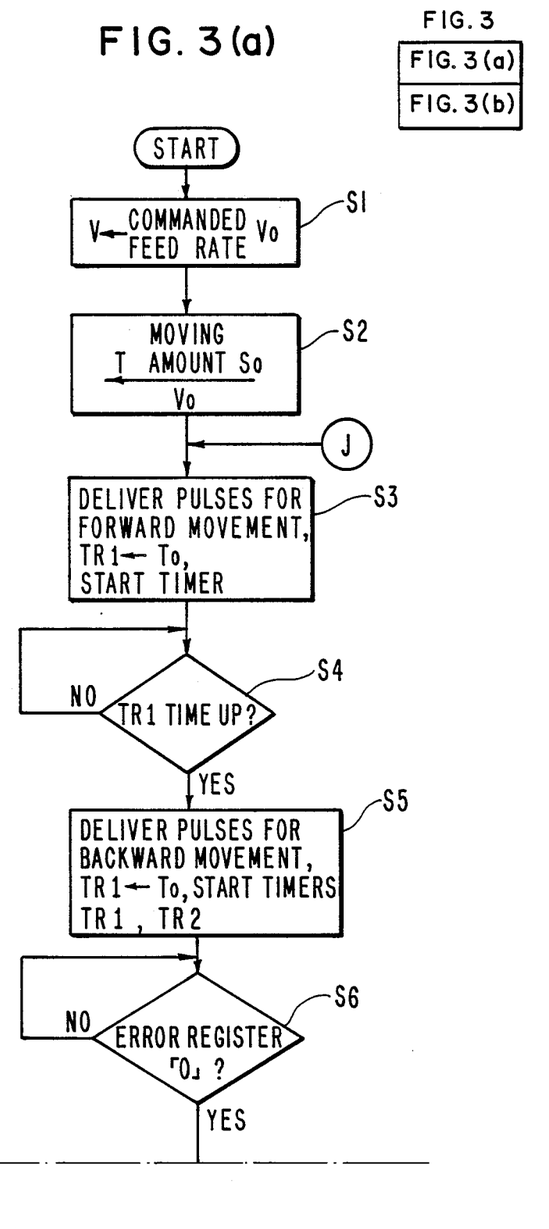
FIGS. 3A and 3B are a flowchart showing the numerical control method according to the first embodiment of the present invention.
Figure 3B:
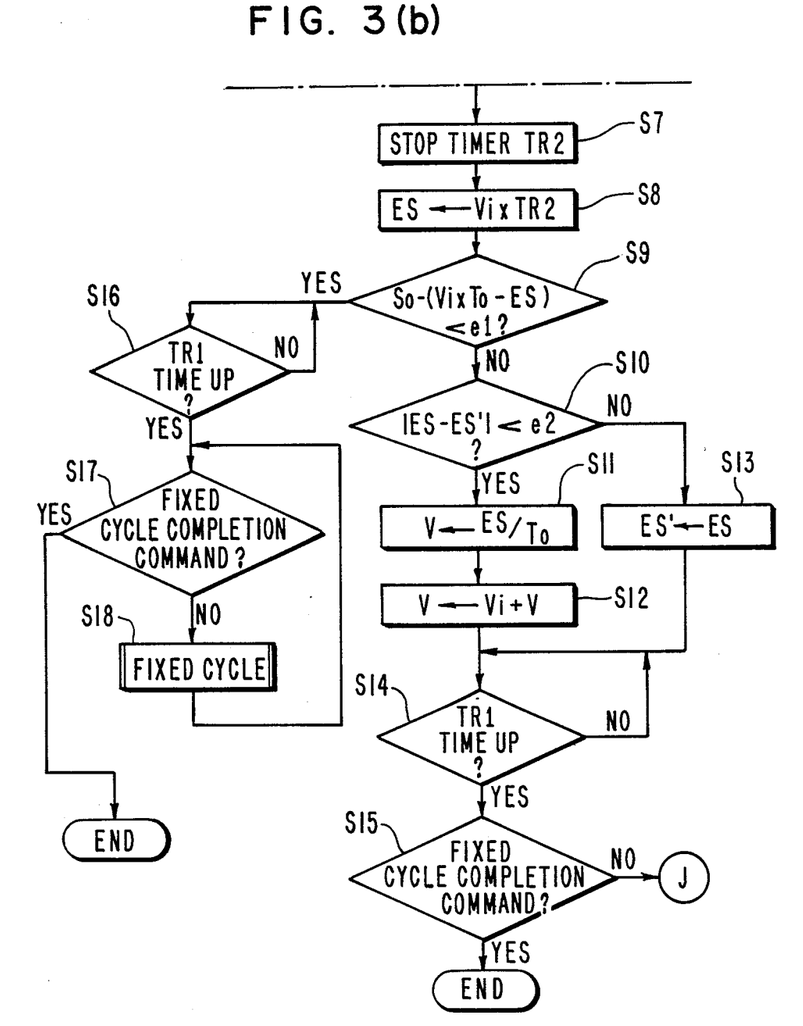

Col. 8,  line  7, change "V" to --V--;
         line 47, delete entire line;
         line 62, change "FIG. 32" to --FIG. 3A--;
         line 66, change "A" to --A--.
```

Signed and Sealed this

Fourteenth Day of May, 1991

Attest:

HARRY F. MANBECK, JR.

Attesting Officer     Commissioner of Patents and Trademarks